Patented Nov. 18, 1952

2,618,545

UNITED STATES PATENT OFFICE 2,618,545

PHYTOTOXIC COMPOSITION AND USE THEREOF

Jack S. Newcomer, Lincoln Park, Mich., assignor to Sharples Chemicals Inc., a corporation of Delaware No Drawing. Application August 30, 1950, Serial No. 182,397

16 Claims. (Cl. 71—2.7)

The present invention relates to an improved method and compositions whereby the normal life cycle of a plant is altered with advantageous results. More particularly, it relates to a process and compositions for treating growing plants with trichloroacrylic acid.

The acid employed in this invention is unusually versatile, first, with respect to the types of plant response which it is capable of inducing, second, with respect to the types of plants upon which it exerts useful effects, and third, with respect to the forms in which it may be used. Thus the acid may be used per se, or it may be used in the form of any of its equivalents, said equivalents including, for example, the anhydride, acid halides, and salts. Water-soluble forms are somewhat preferred to those forms which are water-insoluble or but sparingly soluble in water.

This acid may bring about such efforts as inhibition of growth of terminal buds and shoots with frequent accompanying enhancement of growth of lateral buds and shoots; destruction of terminal buds and shoots without causing serious damage to the older foliage; retardation of blossom formation; inhibition of second growth on defoliated crops, such as cotton; and total destruction of the plant. The particular plant response manifested depends to a large extent upon the applied concentration of the response agent, and upon the species and degree of maturity of the plant undergoing treatment. The term plant as used herein is understood to include all portions of the plant, such as the roots, stems, leaves, blossoms, seeds, and fruits.

Although under suitable conditions any of the foregoing effects may be induced, depending upon the conditions of treatment, the process is particularly outstanding in the accelerated induction of plant physiological effects such as the destruction or inhibition of terminal buds, or such as selective or non-selective killing of plants, and for convenience will be described more particularly with reference thereto. Destruction of terminal buds may be defined as a mild phytotoxic effect, whereby the terminal buds are killed but other portions of the plant, including the older, better established foliage, are not seriously affected. In general, this effect is brought about by the use of quite small amounts of the acid of this invention. On the other hand, larger amounts of said acid may be employed to cause plant kill, that is, total destruction of the plant. Plant kill is a drastic phytotoxic effect of importance in the extermination of dicotyledonous weeds (usually broadleafed plant species) and of monocothyledonous weeds (including various species of grasses), etc.

It is often advantageous in the culture or harvesting of certain crops to kill or retard the growth of the terminal buds or shoots of the plants. Thus, in the growth of lima bean plants, it is noted that even in the so-called bunch varieties there is an inherent tendency for the plant to send out long shoots which cross the between-row spaces in a field. This tendency makes it difficult or, at times impossible to move equipment through the field rows for the purposes of cultivation, fertilization, or harvesting of the crop without undue injury to the plants. The acid of this invention, when applied in the various manners described below and in suitable dosages as indicated below, causes a kill or retardation of these terminal shoots and prevents the inter-row overlap of lima bean plants, thus avoiding the difficulties normally inherent in the cultivation of lima beans. Such application of the acid of this invention may be accomplished without sufficient injury to the other portions of the lima bean plants to cause a decrease in the yield of beans obtained from them.

Another example of the utility of said acid is its application to cotton plants at harvest time. In this connection, the material may be used coincident with or subsequent to the application of a defoliant. Presently used defoliation chemicals cause the plant to drop those leaves already growing, but they have insufficient effect in repressing the development of new leaves and shoots. This new growth, generally called "second growth," is quite green and succulent and in mechanical harvesting of cotton will likely produce a green stain on the cotton lint. The tendency for second growth becomes pronounced whenever a cotton plant is artificially defoliated, and is particularly evident in those areas where sufficient soil moisture is present during the harvest season and under those cultural practices whereby sufficient nutrient, particularly nitrogen, is kept in the soil up to harvest time.

The acid of this invention when applied with the defoliant chemical may be used at a dosage which will not cause plant kill and will not interfere with the opening of the partially matured cotton bolls. Under these same conditions the dosage is sufficient to destroy the growing buds to a large extent. The same effect may be obtained by applying the material in a spray or other application subsequent to the application of the defoliant chemical. In both cases, the destruction of the terminal buds causes the plant to cease vegetative growth until such a time as latent or dormant buds may become active. Normally this interval of time is sufficient to permit harvest without the interfering effects of new vegetative growth.

This invention also provides an economical and effective means of destroying undesirable vegetation including many species of unwanted herbs, grasses, ferns, etc.

A large number of chemicals have been proposed and used under various conditions for the control of noxious plants. Such materials include sodium chloride, potassium chloride, inorganic boron compounds, sodium chlorate, various arsenic compounds, thiocyanates, cyanates, trichloroacetates, chlorinated phenols, dinitrocresols, chlorinated phenoxy aliphatic acids such as 2,4-dichlorophenoxyacetic acid (commonly known as 2,4-D), etc.

Some of the materials so used are extremely efficient for the control of the large broadleafed weeds. However, only a few give acceptable control of annual grasses, and these give an even poorer control of the perennial grasses such as Johnson grass, quack grass, etc. Those which will control such grassy weeds do so only at very high dosage per acre and usually with attendant sterilization of the soil in the area where they are employed. The material heretofore most satisfactory for perennial grass control without major soil sterilization is trichloroacetic acid and its salts.

The acid of this invention provides an effective control means for a very wide variety of plants. It is of exceptional economic value for the control of the perennial grasses. Thus, said acid destroys Johnson grass, for example, at dosages per acre and at costs considerably less than those entailed by the use of the trichloroacetates. For such applications, trichloroacrylic acid is effective at dosages which give little, if any, sterilization of the soil, and any such sterilization which might take place is of such short duration that it does not interfere with the production of a crop on the area treated.

The acid of this invention may be used to control weeds in crop land according to a variety of methods. For example, it is useful during a period when a field is allowed to remain fallow. A combination of one or more applications of said acid, together with mechanical operations, such as plowing and discing, may be employed in areas seriously infested with perennial grasses.

For annual grass control and/or for the control of seedlings of perennial grasses, said acid may be applied early in the growing season when a substantial part of the grass seed is germinating or has germinated and the plants are present in the form of very young and accordingly susceptible seedlings. In such application, the seedlings and those seeds which are in the process of germination, as well as many of the seeds which germinate within a period of a few days or weeks after application, will be destroyed.

The acid may also be applied to the above ground portion of vigorous and established grassy stands. Such application is often useful and necessary, but in general will involve the employment of considerably higher dosages per acre than those necessary under the conditions mentioned above.

Although trichloroacrylic acid is more commonly employed to control or inhibit the growth of all plants in a treated area, it may under certain instances be used for the treatments wherein a growing crop is involved. This is feasible when a relatively resistant crop is infested with susceptible weeds. Frequently, by the use of mechanical means, it is feasible even where the crop is fairly susceptible to the chemical. In the latter connection, resort may be had to a directed spray whereby application is made preferentially to the weeds with only slight amounts of the material coming in contact with the crop plants. This may be accomplished by hand spraying the weeds, by mechanical "stem spraying" whereby the weeds close to the ground are covered with spray and the spray touches only a very small segment of the stem of the crop plant, or by shielding the crop plant from direct contact with the particles of the droplets of the applied material.

In certain instances, application may be made directly to a growing crop without regard to selectively contacting only the weed species. Thus pre-emergent applications may be employed in instances where the crop seed is deep planted, slow germinating, or inherently resistant to the chemical. In post-emergent application this method is successful when the crop is either resistant to the chemical or is of such a stage of growth or vigor as to largely resist destructive action of the chemical while more susceptible, noxious plant species are killed. Thus, fields of sugar cane in which the cane is at least several inches in height may be treated to destroy Johnson grass seedlings pervading the field.

In many instances it is desirable to kill plant growth in areas where no production of a crop is contemplated. Among such areas are sports fields such as tennis courts, tracts about various buildings such a offices, factories and barnyards, along fences, along power or railway rights-of-ways, highways, etc. A variety of plant species and a great variation in the stage of growth of the plants of these species are usually found in such areas. The dosage of trichloroacrylic acid should be sufficient to kill the older plants and the more resistant species where substantially total elimination of growth is desired. In such instances, soil sterilization over a relatively long period of time is often a desirable feature. The use of trichloroacrylic acid in dosages much above those normally applied to farm land will accomplish these desired results very efficiently. For this use of some of the presently used chemicals listed above have been employed, and the inorganic materials have found particular utility for this purpose. Even so, trichloroacrylic acid affords a more effective and less costly method than do these other products. It also does not have the attendant draw-backs characteristic of some of the other compounds, such as extreme toxicity to animals grazing upon the treated area, corrosiveness to equipment, fire hazard, or other dangers or inconveniences characteristic of other such weed killers.

In the practice of the invention there is applied to the plant a composition which contains trichloroacrylic acid which may be in the form of the acid per se or in other form, such as the anhydride, an acid halide, or a salt which contains an inorganic or organic cation.

Thus it will be seen that the acid is the active material, and that this is so whether it is used as such, or in the form of any of its chemical equivalents. Changes at the carboxyl group are mere changes in form rather than changes in substance.

Examples of acid halides are trichloroacrylyl chloride and trichloroacrylyl bromide.

Suitable salts include those which contain an inorganic or organic cation such as sodium, potassium, calcium, strontium, barium, magnesium, aluminum, iron, cobalt, nickel, zinc, cadmium, mercury, copper, ammonium, mono-, di- and tri-alkylammonium, mono-, di- and tri-alkanolammonium, and mixed alkylalkanolammonium which is N-substituted by from 2 to 3 radicals of the type indicated, in chemical combination with such number of trichloroacrylate anion or anions as is demanded to satisfy valence requirements.

The alkylammonium salts such as monoalkylammonium, dialkylammonium, or trialkylammonium preferably have from 1 to 12 carbon atoms in each alkyl group, the totality of carbon atoms preferably being not more than 12. The alkanolammonium salts such as monoalkanolammonium, dialkanolammonium, or trialkanolammonium preferably have from 2 to 3 carbon atoms in each alkanol group. The mixed alkylalkanolammonium salts such as monoalkyl monoalkanolammonium, dialkyl monoalkanolammonium, or monoalkyl dialkanolammonium preferably have from 1 to 4 carbon atoms in each alkyl group and from 2 to 3 carbon atoms in each alkanol group.

Examples of monoalkylammonium salts are the monomethylammonium, monoethylammonium, monopropylammonium, monobutylammonium, monoamylammonium, monohexylammonium, monoheptylammonium, monooctylammonium, monononylammonium, monodecylammonium, monoundecylammonium, monododecylammonium and similar monoalkylammonium salts of trichloroacrylic acid.

Examples of dialkylammonium salts are the dimethylammonium, diethylammonium, dipropylammonium, dibutylammonium, diamylammonium, dihexylammonium, methylethylammonium, ethylpropylamonium, propylbutylammonium, butylamylammonium, amylhexylammonium, methylundecylammonium, and similar dialkylammonium salts of trichloroacrylic acid.

Examples of trialkylammonium salts are the trimethylammonium, triethylammonium, tripropylammonium, tributylammonium, methyldiethylammonium, ethyldipropylammonium, propyldibutylammonium, methyldiamylammonium, ethyldiamylammonium, methylethylpropylammonium, ethylpropylbutylammonium, and similar salts of trichloracrylic acid.

Examples of monoalkanolammonium salts are the monoethanolammonium, monopropanolammonium, and similar salts of trichloroacrylic acid.

Examples of dialkanolammonium salts are the diethanolammonium, dipropanolammonium, ethanolpropanolammonium and similar salts of trichloroacrylic acid.

Examples of trialkanolammonium salts are the triethanolammonium, tripropanolammonium, ethanoldipropanolammonium, propanoldiethanolammonium and similar salts of trichloroacrylic acid.

Examples of monoalkyl monoalkanolammonium salts are the methylethanolammonium, ethylethanolammonium, propylethanolammonium, butylethanolammonium, methylpropanolammonium, ethylpropanolammonium, propylpropanolammonium, butylpropanolammonium, and similar salts of trichloroacrylic acid.

Examples of dialkyl monoalkanolammonium salts are the dimethylethanolammonium, diethylethanolammonium, dipropylethanolammonium, dibutylethanolammonium, dimethylpropanolammonium, diethylpropanolammonium, diproplypropanolammonium, dibutylpropanolammonium, methylethylethanolammonium, methylethylpropanolammonium, ethylpropylethanolammonium, ethylpropylpropanolammonium, propylbutylethanolammonium, propylbutylpropanolammonium, and similar salts of trichloroacrylic acid.

Examples of monoalkyl dialkanolammonium salts are the methyldiethanolammonium, ethyldiethanolammonium, propyldiethanolammonium, butyldiethanolammonium, methyldipropanolammonium, ethyldipropanolammonium, propyldipropanolammonium, butyldipropanolammonium, methylethanolpropanolammonium, ethylethanolpropanolammonium, propylethanolpropanolammonium, butylethanolpropanolammonium, and similar salts of trichloroacrylic acid.

Trichloroacrylic acid is well known to the art. The preparation of the acid per se and its equivalents may be accomplished by any means known to the art, and suitable methods will suggest themselves to persons skilled in chemical synthesis upon becoming familiar therewith.

Although the applicant does not wish to be bound by any particular theory as to the mechanism whereby the above-described useful plant response effects are produced, a considerable amount of experimentation has strongly indicated that said effects are brought about by the existence in aqueous media of the trichloroacrylate anion. A salient feature of this theory is that the acid of the invention, when applied as the acid per se, or in other form, to a living plant, makes the trichloroacrylate anion available to the plant, at or near the site of application, and at times, through translocation phenomena, at points far removed from the site of application.

The desired anion is made available by virtue of the fact that the acid per se, and its other forms, are water-soluble and ionizable. Therefore, when such a compound is absorbed into the vascular system of a plant, it dissolves in the aqueous plant juices and provides the functioning trichloroacrylate anion. The resulting physiological activity is believed to be ascribable to the presence of said anion, whether or not assisted by the presence of any particular cation or cations. The acid per se and its other forms may thus be regarded as very convenient media for furnishing the desired anion to susceptible portions of the plant.

It follows, therefore, that the acid per se and its other forms are equally usable.

Although the anion produced by the acid or its chemical equivalents becoming dissolved in the fluid of the vascular system or other interior portions of the plant is thought to be the plant response agent, it is true that there are preferred forms of handling this acid in practical applications. Thus the free acid or the acyl halides are somewhat corrosive to certain types of equipment and exert a vesicant action on the human skin which is not encountered with the salts of this acid. Solubility of the various salts of the acid in water varies and a form with at least a moderate solubility is highly useful for field use. The particular chemical form and formulation used in applying the acid to growing plants can also affect penetration of the outer surfaces of the plant by the active agent and influence the degree and rapidity with which the anion becomes available to the plant.

The acid per se has an appreciable solubility in water. The other forms are also soluble in water. Some of them are highly soluble, while others have a lesser degree of solubility.

For field applications, it is preferred to employ compounds having a solubility in water to the extent of at least 0.1% by weight, and still more particularly of at least 1% by weight. However, many of the advantages of the invention may be realized by employing compounds which are soluble in water to the extent of less than 0.1%, and in the experimental evaluations reported herein, solutions of quite soluble salts were used at high dilutions for the purpose of increased accuracy. When relatively insoluble compounds are used, it is preferable that suspensions, emulsions, or dispersions containing said compounds be applied to the plant undergoing treatment. Such suspensions, emulsions, and dispersions may be aqueous or non-aqueous.

From the foregoing it will be appreciated that for plant response purposes very low concentrations in applied aqueous solutions are effective, and that low concentrations in applied suspensions, emulsions, and dispersions, aqueous or non-aqueous, are likewise effective. For example, it has been found that a 0.025% aqueous solution of sodium trichloroacrylate pipetted as droplets onto the primary leaves of young bean plants in the amount of 0.2 ml. per plant (i. e. 50 micrograms per plant) is effective in killing the terminal shoots and buds of said plants with but slight damage to the treated leaves.

The compounds are applied to the crop or plants in any desired manner, such as, in the form of a solid, for example by dusting, or in the form of a liquid, for example by spraying. They may also be applied by injection, such as into the stem of the plant, or at a point at which the epidermal layer is broken or wounded, or to the roots of the plant, or otherwise.

Compositions may be formulated by admixing the active ingredient with any desired liquid or solid carriers such as any of the finely divided solid carriers known in the dusting art, which are preferably of large surface area, such as a clay, for example, fuller's earth, pyrophyllite, talc, bentonite, kieselguhr, diatomaceous earth, etc. Any of the commercial clays available on the market in finely divided form are highly satisfactory, and particularly those which are normally employed as insecticide carriers. Commercial clays, it will be understood, are generally identified by trade names (reflecting the source and mode of processing) of which Homer Clay, Celite, and Tripoli may be mentioned as typical.

Non-clay carriers which may be formulated with the active material include, for example, sulfur, volcanic ash, calcium carbonate, lime, by-product lignin, lignocellulose, flour such as wood, walnut shell, wheat, soy bean, potato, cotton seed, etc.

Any desired mixture may be prepared by any suitable method. Thus, if a solid, the active material may be ground to a fine powder and tumbled together with the powdered carrier, or the carrier and the active agent may be ground together; alternatively, the active material in liquid form, including solutions, dispersions, emulsions and suspensions thereof, may be admixed with the finely divided carrier in amounts small enough to preserve the requisite free-flowing property of the final dust composition. Or excess liquid may be removed such as by vaporization, for example, under reduced pressure.

When solid compositions are employed, in order to obtain a high degree of plant coverage with minimum poundage per acre, it is desirable that the composition be in finely divided form. Preferably the dust containing the active ingredient should be sufficiently fine that substantially all will pass through a 50 mesh sieve, and more particularly through a 200 mesh sieve. Excellent results have been obtained in which the dust composition consisted predominantly of particles in the range from 15 to 45 microns. Finer dusts, such as those consisting largely of particles in the range of 5 microns and below, have excellent covering capacity, but are somewhat more subject to drift, and are more expensive to prepare.

For spray application the active ingredient may be dissolved or dispersed in a liquid carrier such as water or an oil. Suitable oils for herbicidal application include those of petroleum, animal, vegetable, or synthetic origin, such as kerosene, fuel oil, lubricating oil, soy bean oil, linseed oil, castor oil, sperm oil, cod liver oil, etc. For killing of terminal buds and shoots, oils are usually selected which in themselves are relatively harmless to other portions of the plant.

Aqueous solutions or dispersions are economical and desirable. In general, the choice of the particular liquid carrier employed may be guided somewhat by prevailing circumstances, such as its availability, its solubility or dispersion characteristics toward the particular active agent employed and/or its toxicity toward the plants undergoing treatment. In general, water is an excellent liquid carrier.

Thus spray formulations comprising the active ingredient in the form of a solution, suspension, dispersion, or emulsion in aqueous or non-aqueous media may be employed.

Emulsions or dispersions of the active ingredient in the liquid carrier may be prepared by agitation of the agent with the carrier. This is commonly done at the time of spraying. Preferably, however, the agitation should take place in the presence of an emulsifying or dispersing agent (surface-active agent) in order to facilitate the preparation of said emulsion or dispersion. Emulsifying and dispersing agents are well known in the art, and include, for example, fatty alcohol sulfates, such as sodium laurylsulfate, aliphatic or aromatic sulfonates, such as sulfonated castor oil or the various alkarylsulfonates (such as the sodium salt of monosulfonated nonyl naphthalene), and non-ionic types of emulsifying or dispersing agents such as the high molecular weight alkyl polyglycolethers or analogous thioethers, such as the decyl, dodecyl, and tetradecyl polyglycolethers and thioethers containing from 25 to 75 carbon atoms.

For convenience, the emulsifying or dispersing agent is mixed with the plant response agent prior to admixture with the carrier, and the preparation of the emulsion or dispersion is accomplished at the place where the spraying is to be undertaken merely by agitating said mixture with the carrier, particularly when aqueous. The plant response agent, if not soluble in the carrier in the concentration desired, may be dispersed as such, or may be dissolved in a solvent, and emulsified by agitation with the carrier. This applies particularly when both water and oil are employed in the carrier.

The concentration of surface-active agent in the final emulsion or dispersion should be sufficient to make the phases readily dispersible, and in general for this purpose from 0.02% to 2% is satisfactory. Any desired additional amount may be added such as for adjuvant purposes, as will be understood. Thus, if the surface-active agent is to be premixed with the plant response agent, the selected relative proportions of the two will largely depend upon the purposes in mind. For mere purposes of forming spray emulsions or dispersions, mixtures containing a surface-active agent to the extent of from about 1% to about 25% by weight of plant response agent are satisfactory. However, it is to be understood that the proportion may be varied over a wide range, particularly if pronounced adjuvant effects are desired.

Emulsifying and dispersing agents usually also possess the properties of wetting agents, and in this capacity greatly assist in bringing about efficient contact between liquid and the plant.

The use, if desired, of adjuvants, such as wetting agents, and/or humectants, is also contemplated in connection with solutions of the active ingredient, such as water solutions. Any suitable wetting agent and/or humectant may be employed for this purpose, such as the wetting agents more particularly referred to herein. Examples of humectants are glycerine, diethylene glycol, ethylene glycol, polyethylene glycols generally, and well known sugar-containing mixtures, such as corn syrup and honey.

For adjuvant purposes, any desired quantity of wetting agent may be employed, such as up to 250% or more based on active ingredient. For wetting purposes, the amount of adjuvant used may be considered to be that required to impart the desired wetting qualities to the formulation whether used in finely divided solid form or as a spray solution, or otherwise, such as from approximately 0.005% to 0.5% by weight of total formulation. The use of considerably larger amounts is not based upon wetting properties, although present, but is a function of the physiological behavior of the wetting agent after spraying upon the plant.

It should be considered that once the formulation has been applied to the plant, the concentration of wetting agent existing upon the plant is in no sense a function of the concentration existing in the original formulation, particularly in the case of a spray solution. Thus, evaporation might concentrate the wetting agent considerably in the case of a spray solution, or the presence of dew on the leaf surfaces, or of plant juices on the leaf surfaces might considerably dilute this agent. Economical spray rates normally run from 1 to 50 gallons per acre. Dews may vary from possibly 10 to 2000 gallons per acre.

As will be seen, wetting agents, particularly when in solid form, may be compounded with the active ingredient when in solid form.

Wetting agents appear to serve the multiple purposes of aiding the penetration of the leaf surface by the active ingredient, spreading of the active ingredient over the leaf area, and retarding or preventing crystallization in the case of those forms of the active ingredient which show a tendency to crystallize when the spray dries.

Although the active ingredient may be applied to the growing plant in concentrated form, it is usually desirable to employ liquid or solid formulations, for example as discussed above in which the active ingredient constitutes less than 30% by weight of the total, such as less than 10% and even as low as 0.1%.

Other substances than the carrier and/or surface active agent may be included in the solid or liquid formulations, if desired, to bring about various physical improvements such as the prevention of lumping during storage, or improvement in respect to coverage, moisture adsorption, adherence, etc. Likewise, other substances may be included in said formulations, if desired, to accomplish various physiological results. For example, it may at times be expedient to include singly or in combination substances such as fungicides, insecticides, bactericides, fertilizers, or types of plant response agents other than those agents discussed herein. The preparation of such additions and the materials added do not require elaboration, but will suggest themselves to persons skilled in the art upon becoming familiar herewith.

In the practice of the process as applied to terminal bud and shoot killing, the rate of application (i. e. the amount of active ingredient per crop unit) for best results will depend among other factors upon the species of plants being treated and upon their maturity.

The active ingredient of this invention, for example, in the form of the sodium salt, is frequently effective in killing the terminal buds and shoots of plants when applied at the rate of considerably less than one pound per acre, and only under unusual circumstances is it advisable to apply more than one pound per acre to obtain the desired results. Use of dosages greatly in excess of the minimum required for complete killing of said buds may result in shock to the plant with attendant injury to the remainder of the plant.

Plant kill usually requires somewhat higher rates of application, but generally from 1 to 20 pounds per acre is sufficient for pre-emergent and seedling applications and rarely more than 50 to 75 pounds per acre is necessary even for vigorous, older plants. In instances where soil sterilization is a desirable result even higher dosages may be used. On the one hand, when plant killing is the objective, any amount sufficient for this purpose may be applied. In the latter connection, since different species of plants vary markedly in their relative resistance to herbicidal action, selective killing of plant species may be practiced.

The following examples illustrate the invention (generally and without limitation to the specific form of the active ingredient employed) as applied to the treatment of various plants to produce various plant responses including terminal bud inhibition and killing, and herbicidal action.

Example 1

The top surfaces of both primary leaves of young Dwarf Horticultural bean plants were treated with aqueous solutions of sodium trichloroacrylate, the solutions being applied to the leaves by pipetting. Each leaf received a 0.1 ml. dosage (0.2 ml. per plant). Some plants were treated with a 0.025% solution of the salt, others with a 0.05% solution, others with a 0.1% solution, and still others with a 0.25% solution; eight plants were treated at each concentration. The following observations were made 7 days after the solutions were applied to the plants, the treated plants being compared with untreated controls:

| Concentration of aqueous solution, percent | Results |
| --- | --- |
| 0.025 | Terminal growth bud killed and new shoots developed from first and second nodes; slight spotting of primary leaves. |
| 0.05 | Substantially the same as for the 0.025% solution. |
| 0.1 | Terminal shoot and the developing first trifoliate leaf were stunted and remained very small; primary leaves considerably burned. |
| 0.25 | The same as for the 0.1% solution, except more pronounced burning of primary leaves. |

Example 2

The Dwarf Horticultural bean plants used in this experiment were older and more mature than the plants used in Example 1; flower buds were beginning to form. Groups of from 12 to 20 such plants were sprayed with aqueous solutions of sodium trichloroacrylate of various concentrations. Results were observed 8 days after the sprays were applied; controls were also observed.

| Concentration of aqueous solution, percent | Results |
| --- | --- |
| 0.001 | No effect. |
| 0.0025 | Do. |
| 0.005 | Do. |
| 0.01 | Blooming of flower buds somewhat retarded. |
| 0.025 | Do. |
| 0.05 | Do. |
| 0.1 | Flower buds prevented from blooming; growth of plants somewhat inhibited; slight burning at edges of leaves. |
| 0.25 | Flower buds seriously inhibited; growth of plants markedly inhibited; considerable leaf burn. |

Example 3

Buckwheat plants which were beginning to bear flower buds were sprayed with aqueous solutions of sodium trichloroacrylate of various concentrations. Groups of 8 plants each were so treated, and results were noted 8 days after application of the sprays.

Solutions of 0.001%, 0.0025%, 0.005%, 0.01%, 0.025%, and 0.05% concentrations, respectively, produced no observable effect; that is, the plants sprayed with these solutions were blooming the same as unsprayed control plants. The flower buds of plants sprayed with a 0.1% solution were somewhat inhibited. In the case of plants sprayed with 0.25% solution, the flower buds had failed to develop further than at the start of the experiment, and the leaves were considerably burned.

By comparison with Example 2, it is seen that the bean plants were somewhat more sensitive than buckwheat plants to sodium trichloroacrylate.

Example 4

The pipetting procedure of Example 1 was used to treat young Dwarf Horticultural bean plants with aqueous solutions of sodium trichloroacrylate and sodium trichloroacetate, respectively. In the case of each chemical, the concentrations employed were 0.05%, 0.1%, 0.25%, 0.5%, and 1.0%. Dosage per leaf was 0.1 ml. Six plants were treated at each concentration of each chemical. Results were noted 10 days after the start of the experiment, the treated plants being compared to controls.

Sodium trichloroacetate had no effect on the development of the first trifoliate shoot in the case of solutions up to 0.25% concentration. On the other hand, sodium trichloroacrylate killed the terminal growth bud and severely retarded the first trifoliate shoot at the same concentrations, even in the case of the 0.05% solution. Comparing the effects of the two chemicals at each concentration from the lowest (0.05%) to the highest (1.0%), the plants were damaged much more by sodium trichloroacrylate than by sodium trichloroacetate. In fact, the former caused marked damage even at 0.05% concentration, while no appreciable damage was caused by the latter until the 0.5% solution was reached.

Example 5

Separate groups of potted young Dwarf Horticultural bean plants, each group consisting of eight plants, were dipped to the first nodes into the following respective aqueous test solutions: 0.01% and 0.025% sodium trichloroacrylate, and 0.01% and 0.025% sodium trichloroacetate. Excess liquid was shaken off.

Observations were made 9 days after the solutions were applied to the plants. The terminal ends above the third nodes were destroyed on most of plants treated with the 0.01% solution of sodium trichloroacrylate. In the case of plants treated with the 0.025% solution of this salt, the terminal ends above the third and even second nodes were destroyed on most of the plants. Those plants treated with the solutions of sodium trichloroacetate were uninjured, having substantially the same appearance as control plants.

Example 6

A series of aqueous solutions of sodium trichloroacrylate of the following respective concentrations was prepared: 0.01%, 0.025%, 0.05%, 0.1%, and 0.25%. Another series was prepared having the same concentrations of triethylammonium trichloroacrylate, and a third having the same concentrations of sodium trichloroacetate.

Separate groups of potted young Dwarf Horticultural bean plants, each group consisting of eight plants, were dipped to the first nodes into the respective solutions and excess liquid was shaken off. Observations were made 4 days after the solutions were applied to the plants, treated plants being compared with controls.

The results were as follows for plants treated with the solutions of sodium trichloroacrylate:

| Concentration of aqueous solution, percent | Results |
| --- | --- |
| 0.01 | Primary leaves same as controls; terminal shoots retarded. |
| 0.025 | About the same as for the 0.01% solution. |
| 0.05 | Do. |
| 0.1 | Primary leaves slightly burned, especially at edges; terminal shoots retarded. |
| 0.25 | About the same as for the 0.1% solution. |

Each concentration of triethylammonium trichloroacrylate gave substantially the same results as the sodium salt at the same concentration.

On the other hand, the only solution of sodium trichloroacetate which exhibited phytotoxicity, and then only to a small degree, was the 0.25% solution. The primary leaves of plants treated with this solution were burned lightly at the edges; the terminal shoots appeared to be normal.

Example 7

Groups of Perfection pea plants in flats, eight plants to a flat, were used in this experiment. The plants were at a stage of growth where flower buds were beginning to develop on some of the plants.

Separate groups (i. e., a group consisting of one flat) were dipped into the following respective aqueous solutions: 0.01%, 0.025%, 0.05%, 0.1%, 0.25%, and 0.5% sodium trichloroacrylate, and sodium trichloroacetate solutions of the same concentrations. Each solution contained, in addition to the active ingredient, 0.25% of a wetting agent. Excess liquid was shaken off.

Observations were made 6 days after the solutions were applied to the plants.

The plants showed no apparent injury from the 0.01%, 0.025%, and 0.05% solutions of sodium trichloroacrylate. The 0.1% solution caused noticeable injury to the leaves, the 0.25% solution caused rather severe injury, and the 0.5% solution caused quite severe injury.

The five lower concentrations of sodium trichloroacetate caused no injury to the plants, and the 0.5% solution burned the leaves lightly.

*Example 8*

The test solutions used in this experiment were 0.01%, 0.025%, 0.05%, 0.1%, 0.25%, 0.5%, and 1.0% aqueous solutions of sodium trichloroacrylate, triethylammonium trichloroacrylate and sodium trichloroacetate, respectively.

Separate groups of young Dwarf Horticultural bean plants, five plants per group, were treated with the respective solutions by injecting the solutions into the hypocotyls by means of a hypodermic needle. The dosage per plant was 0.05 ml.

Observations were made 6 days after the treatments. The results on plants treated with the solutions of sodium trichloroacrylate are summarized below.

| Concentration of aqueous solution, percent | Amount active ingredient per plant (Micrograms) | Results |
|---|---|---|
| 0.01 | 5 | Same as controls. |
| 0.025 | 12.5 | Do. |
| 0.05 | 25 | Primary leaves same as controls; terminal shoots slightly retarded. |
| 0.1 | 50 | Primary leaves same as controls; terminal shoots dropped off at third node. |
| 0.25 | 125 | Primary leaves same as controls; terminal shoots yellow and very small; trifoliate leaves somewhat burned. |
| 0.5 | 250 | About same as for 0.25% solution. |

Effects produced by the solutions of triethylammonium trichloroacrylate were about the same as those produced by the sodium salt.

The phytotoxic activity of sodium trichloroacetate was much less than that of the salts of trichloroacrylic acid. In fact, the only member of the series which displayed phytotoxicity was the 0.5% solution, which caused slight retardation of the trifoliate shoots.

*Example 9*

A series of aqueous solutions of trichloroacrylyl chloride of the following respective concentrations was prepared: 0.025%, 0.05%, 0.1%, 0.25%, and 0.5%. Each solution also contained 0.5% of a wetting agent.

The top surfaces of both primary leaves of young Black Valentine bean plants were treated with the above solutions, which were applied to the leaves by pipetting. Each leaf received a dosage of 0.1 ml. (0.2 ml. per plant). Separate groups of eight plants each were treated with the respective solutions.

The following observations were made 8 days after the solutions were applied to the plants, the treated plants being compared with controls:

| Concentration of aqueous solution, percent | Results |
|---|---|
| 0.025 | Terminal shoots considerably retarded; small secondary shoots on first and second nodes. |
| 0.05 | Terminal shoots undeveloped, some retarded. |
| 0.1 | Terminal shoots and tips abscised or dead; small secondary shoots on first and second nodes. |
| 0.25 | Terminal shoots severely retarded; some trifoliate leaves abscised, others undeveloped; small secondary shoots on first and second nodes. |
| 0.5 | Similar to 0.25% solution, except foliage and stems of plants more severely burned. |

*Example 10*

Four series of aqueous solutions of trichloroacrylic acid, of sodium trichloroacrylate, of ammonium trichloroacrylate, and of ammonium trichloroacetate of the following respective concentrations were prepared: 0.0005%, 0.001%, 0.0025%, 0.005%, and 0.01%.

Separate groups of potted young Dwarf Horticultural bean plants, each group consisting of eight plants, were dipped to the first nodes into the respective solutions and excess liquid was shaken off. Observations were made 9 days after the solutions were applied to the plants, treated plants being compared with controls.

Physiological effects were as follows:

In the table below, PL means primary leaves; TL-1 means the first trifoliate leaves; TL-2 means the second trifoliate leaves.

| Concentration, percent | Trichloroacrylic acid | Ammonium trichloroacetate |
|---|---|---|
| 0.0005 | PL not affected; TL-1 considerably retarded; TL-2 abscised. | Not affected. |
| 0.001 | do | Do. |
| 0.0025 | PL, slight marginal chlorosis; TL-1 severely retarded; TL-2 abscised. | Do. |
| 0.005 | PL, moderate marginal chlorosis; TL-1 severely retarded; TL-2 abscised. | Do. |
| 0.01 | PL, considerable chlorosis and marginal burning; TL-1 severely burned and retarded; TL-2 abscised. | Trifoliate shoots, moderately retarded; otherwise not affected. |

The results obtained with the sodium and ammonium salts of trichloroacrylic acid were approximately the same as those obtained by use of the acid per se.

*Example 11*

The germination-inhibiting effects of sodium trichloroacrylate to three kinds of seeds (field corn, rice, and oats) were compared by pipetting 15 ml. of each of several concentrations of aqueous solutions of the chemical into individual 150 mm. petri dishes in each of which 25 seeds were placed. The same kind of tests was carried out with sodium trichloroacetate. Control tests were also carried out.

The average length in mm. of the roots, and of the shoots after incubation for 8 days was compared with the corresponding data in the case of the controls. The resulting data are summarized in the following table. The following table indicates approximate threshold concentration values, at which and above which inhibition of germination was quite noticeable, and below which inhibition was relatively small or absent.

| Material | Field Corn | Rice | Oats |
|---|---|---|---|
| | Percent | Percent | Percent |
| Sodium trichloroacrylate | 0.1 | 0.1 | 0.1 |
| Sodium trichloroacetate | 1.0 | 1.0 | 1.0 |

*Example 12*

Individual plots of grassy weeds, each plot having an area of 10 square feet, were sprayed with aqueous solutions of varying concentrations of sodium trichloroacrylate. Each solution contained 0.1% by weight of a tertiary dodecyl polyglycol thioether as a wetting agent. All the plots were sprayed with a constant volume of solution, namely, 174 ml. per 10 square feet; this rate of application corresponds to 200 gallons per acre. The amounts of active ingredient in the individual solutions were such that the rates of the ingredient applied were 4, 8, 16, 32, and 48 pounds per acre, respectively.

Observations were made 3 days after spraying, the results being as follows:

| Rate of application | Results |
|---|---|
| 4 pounds per acre | Slight injury. |
| 8 pounds per acre | Light injury. |
| 16 pounds per acre | Moderate injury. |
| 32 pounds per acre | Considerable injury. |
| 48 pounds per acre | Heavy injury. |

From the foregoing it can be seen that the acid used in the practice of this invention, whether used per se or in some other form, is highly effective in regulating the growth characteristics of viable seeds or growing plants. For example, the acid may be employed to destroy the terminal buds and shoots of plants, or may be employed to terminate the life cycle of plants, or may be employed to retard the growing of seeds, or may be employed to stunt or terminate the growth of certain unwanted plants to facilitate and favor the growth of wanted plants. Other applications of the invention in the regulation of the growth characteristics of plants will occur to persons skilled in the art upon becoming familiar herewith.

It will be understood that the active ingredient employed herein, whether in the form of the acid per se or in other form, may be compounded with materials capable of imparting a synergistic effect such as ammonium sulfate, ammonium hydrogen sulfate, ammonium sulfamate, etc.

Accordingly, it is to be understood that the particular description is by way of illustration and that the patent is intended to cover by suitable expression in the claims whatever features of novelty reside in the invention.

I claim:
1. A method for inducing a phytotoxic response in a plant, comprising treating said plant with an effective amount of trichloroacrylic acid.
2. A method for killing a viable plant comprising applying to said plant an amount effective for killing said plant of trichloroacrylic acid.
3. A method for inducing a phytotoxic response in a living plant having a vascular system, comprising bringing into association with said vascular system of said plant an effective amount of anions of trichloroacrylic acid.
4. The method of claim 3 in which a compound capable of yielding said anions is applied in aqueous solution to said plant.
5. The process of claim 4 in which said aqueous solution contains a wetting agent.
6. The method of claim 3 in which a compound capable of yielding said anions when in aqueous media is applied to the plant in the form of a finely divided solid.
7. The process of claim 3 in which a compound capable of yielding said anions when in aqueous media is applied to the plant in the form of a liquid dispersion.
8. The process of claim 7 in which the dispersion is an aqueous dispersion.
9. A method for inducing a phytotoxic response in a living plant which comprises applying to the surface of said plant in amount sufficient to produce said response a compound which when in the presence of water yields anions of trichloroacrylic acid.
10. A composition prepared for use as a phytotoxic plant response agent which comprises a wetting agent, and a compound which when in the presence of water yields anions of trichloroacrylic acid.
11. The composition of claim 10 having a carrier admixed therewith.
12. The composition of claim 11 in which the carrier is a finely divided solid.
13. The composition of claim 11 in which the carrier is a liquid.
14. The composition of claim 13 in which the carrier is water.
15. A composition prepared for use as a phytotoxic plant response agent which comprises a wetting agent, and trichloroacrylic acid.
16. The composition of claim 15 and a carrier admixed therewith.

JACK S. NEWCOMER.

REFERENCES CITED

The following references are of record in the file of this patent:

Chemical Abstracts, vol. 7 (1913), pages 3490 and 3491.

Chemical Abstracts, vol. 9 (1915), pages 2382 and 2383.